United States Patent [19]
Irvin et al.

[11] 3,952,170
[45] Apr. 20, 1976

[54] MINIATURE APPARATUS FOR REPRODUCING SOUND FROM A STATIONARY RECORD

[75] Inventors: Ronald D. Irvin, Los Gatos; Steven Richard Runyan, Palo Alto, both of Calif.

[73] Assignee: Montron Corporation, Mountain View, Calif.

[22] Filed: Jan. 10, 1975

[21] Appl. No.: 540,267

[52] U.S. Cl. .......................... 179/100.4 R; 360/101; 274/13 R
[51] Int. Cl.² ..................... G11B 3/00; G11B 21/02; G11B 17/06
[58] Field of Search .............. 179/100.4 R; 274/4 R, 274/42 R, 13 R, 13 A; 360/101

[56] References Cited
UNITED STATES PATENTS

| | | | |
|---|---|---|---|
| 3,210,082 | 10/1965 | Murata | 360/101 |
| 3,224,782 | 10/1965 | Isemura | 179/100.4 R |
| 3,281,153 | 10/1966 | Logan | 179/100.4 R |
| 3,322,427 | 5/1967 | Fujimoto | 360/101 |
| 3,369,813 | 2/1968 | Nagashima et al. | 360/101 |
| 3,633,186 | 1/1972 | Lynott et al. | 360/101 |
| 3,821,812 | 6/1974 | Kato | 360/101 |

*Primary Examiner*—Daryl W. Cook
*Attorney, Agent, or Firm*—Flehr, Hohbach, Test, Albritton & Herbert

[57] ABSTRACT

Miniature apparatus for reproducing sound from a stationary record which comprises a base and a main shaft mounted on the base. A disc-like member is rotatably mounted on the main shaft and means is carried by the base for rotating the disc-like member. A cartridge having a stylus therein adapted to engage the record is provided. An arm assembly carries the cartridge in one end thereof and means is provided for mounting the arm assembly on the disc-like member to permit swinging motion of the arm assembly about horizontal and vertical pivot axes. The disc-like member has an arcuate slot therein through which the stylus can extend to engage the record.

19 Claims, 16 Drawing Figures

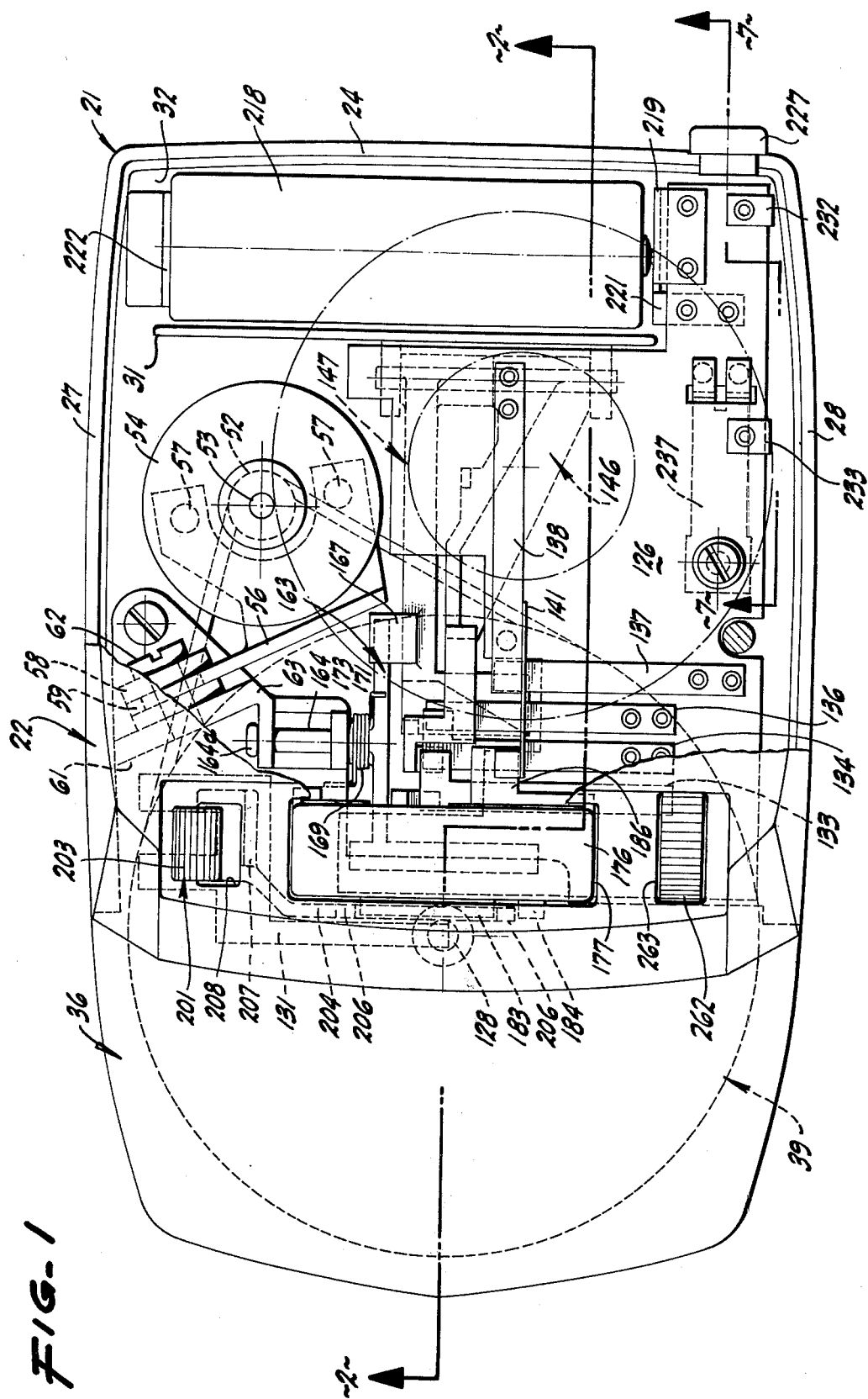

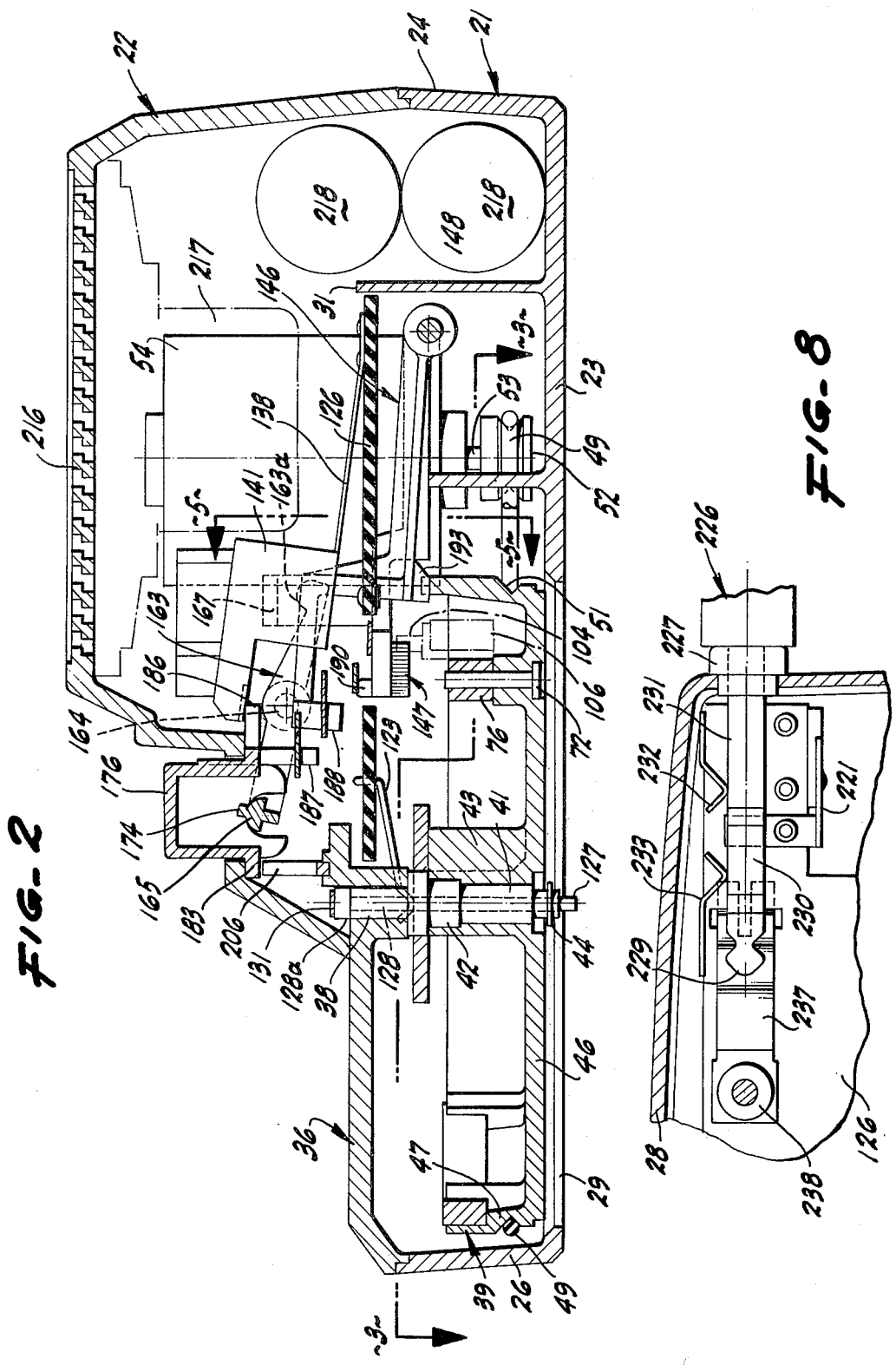

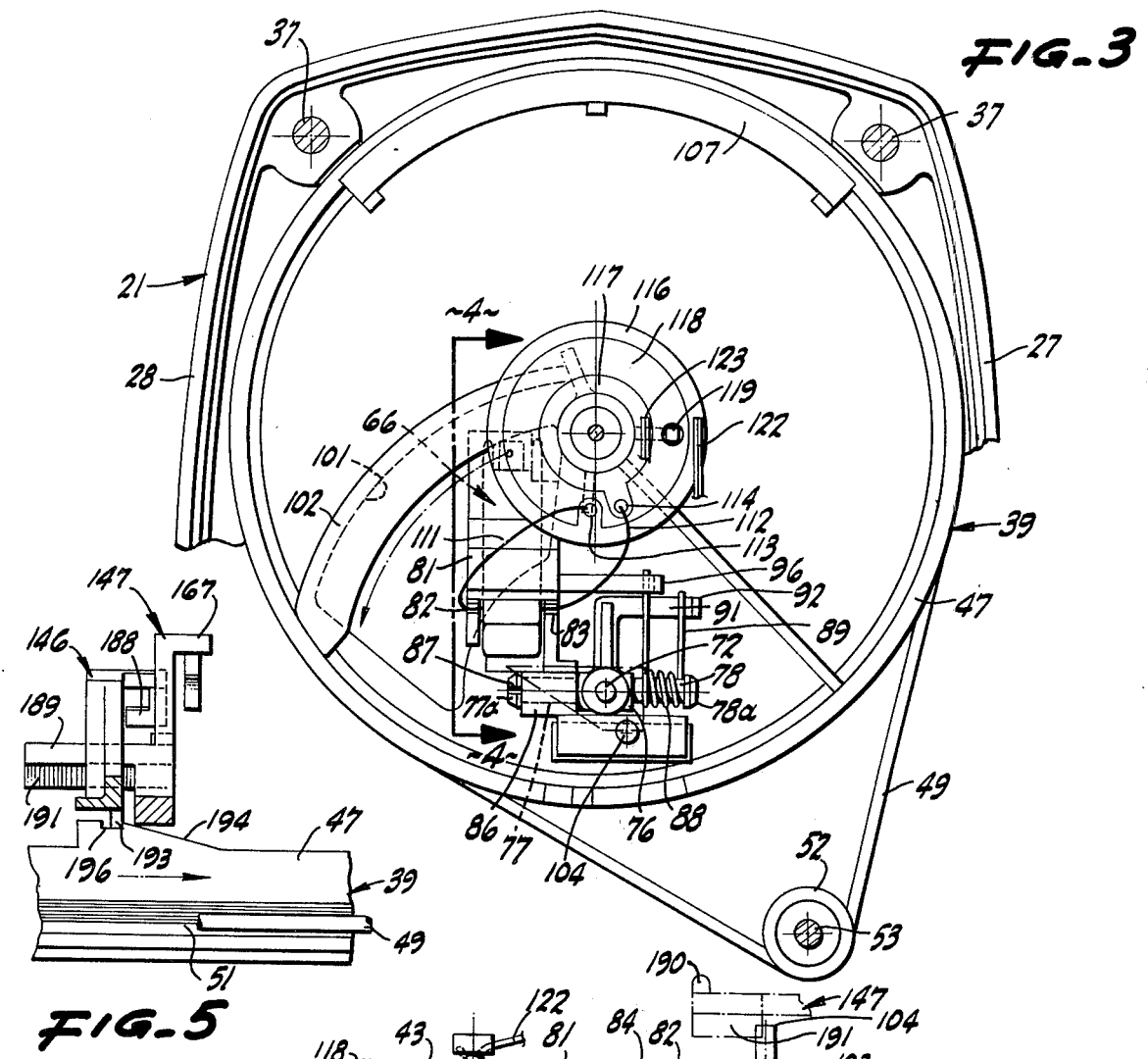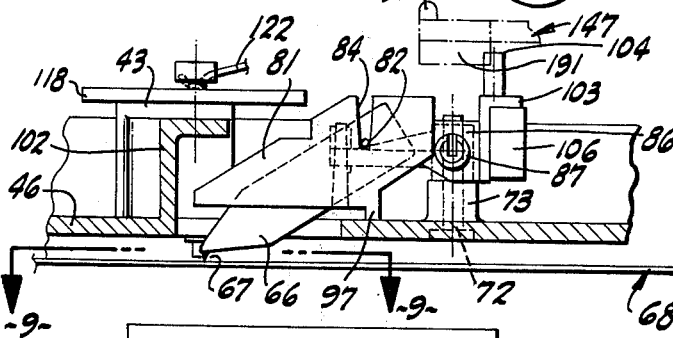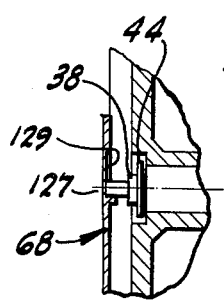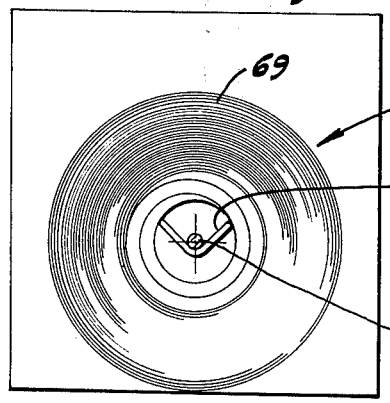

MINIATURE APPARATUS FOR REPRODUCING SOUND FROM A STATIONARY RECORD

BACKGROUND OF THE INVENTION

In U.S. Pat. Nos. 3,192,295 and 3,224,782 there is disclosed apparatus for reproducing sound from stationary records carried by a printed page. The apparatus disclosed therein, however, is unduly complicated and expensive to manufacture which generally prohibits its use in a number of applications where low cost is essential. In application Ser. No. 347,841 filed Apr. 4, 1973 now U.S. Pat. No. 3,883,146, there is disclosed a microphonograph which can be utilized for reproducing sound from stationary records. It also has been found that this microphonograph is unduly complicated and expensive to manufacture. It also has other limitations in that it cannot operate in all positions. There is therefore a need for a new and improved apparatus for reproducing sounds from a stationary record.

SUMMARY OF THE INVENTION AND OBJECTS

Miniature apparatus for reproducing sound from a stationary record comprising a base and a main shaft mounted on the base. A disc-like member is mounted on the main shaft. Means is carried by the base for rotating the disc-like member. A cartridge is provided which has a stylus therein adapted to engage the record. An arm assembly is provided which carries the cartridge in one end thereof. Means is provided for mounting the arm assembly on the disc-like member to permit swinging motion of said one end of said arm assembly about horizontal and vertical pivot axes. The disc-like member has an arcuate slot therein through which the stylus can extend to engage the record. Counterbalance means is carried by the arm assembly so that the arm assembly and the cartridge carried thereby are counterbalanced about the pivot axes for the arm assembly. Counterbalance means is also carried by the disc-like member for counterbalancing the disc-like member for the mass of the arm assembly and the cartridge carried thereby and its counterbalance means. Means is provided for yieldably urging the arm assembly and the cartridge carried thereby in a direction to cause the stylus to be moved to a position whereby it may engage the record in any position of the apparatus. Means is provided for moving the arm assembly and the cartridge carried thereby to move the stylus out of engagement with the record and for retaining it in an at-home position. Latch means is carried by the base for latching the disc-like member to prevent rotation of the same when the arm assembly is in the at-home position. Push button means is carried by the base and is movable to a position to release the disc-like member to permit rotation of the same and to cause operation of said means carried by the base for rotating the disc-like member and for releasing the arm assembly to permit the cartridge and the stylus carried thereby to move to a position whereby the stylus can engage the record.

In general, it is the object of the present invention to provide a miniature apparatus for reproducing sound from a stationary record which is capable of being utilized in any position with a simplified push button operation.

Another object of the invention is to provide an apparatus of the above character which is statically balanced.

Another object of the invention is to provide an apparatus of the above character which has greater resistance to external shock.

Another object of the invention is to provide an apparatus of the above character in which an increased visible area is provided to permit viewing of the printing associated with the stationary record.

Another object of the invention is to provide an apparatus of the above character in which the window surfaces provided are generally parallel to the printed page in order to avoid distorted light reflections.

Another object of the invention is to provide an apparatus of the above character which can be utilized with larger records.

Another object of the invention is to provide an apparatus of the above character in which an audio active circuit is provided to permit one to listen to his own voice as amplified through the electronics in the apparatus.

Another object of the invention is to provide an apparatus of the above character in which one can first hear himself speak through the electronics of the apparatus and then hear the language which is recorded on the record as an aid to learning a language.

Another object of the invention is to provide an apparatus of the above character in which a plurality of switches have been mounted upon a printed circuit board to reduce the cost of such switches and to make it possible to provide a multiplicity of functions economically.

Another object of the invention is to provide an apparatus of the above character in which the assembly operations have been greatly simplified.

Another object of the invention is to provide an apparatus of the above character in which motor control circuit has been provided which causes the motor to operate at an essentially constant speed regardless of the voltage being supplied from the batteries.

Another object of the invention is to provide an apparatus of the above character in which the controls have been conveniently situated.

Another object of the invention is to provide an apparatus of the above character which cannot be inadvertently left on.

Another object of the invention is to provide an apparatus of the above character in which the push button operation provided has two operating positions, either push-hold or push-lock.

Additional features and objects of the invention will appear from the following description in which the preferred embodiments are set forth in detail in conjunction with the accompanying drawings.

DESCRIPTION OF THE DRAWINGS

FIG. 1 is a top plan view of a miniature apparatus for reproducing sound from a stationary record incorporating the present invention with the cover removed.

FIG. 2 is a cross-sectional view taken along the line 2—2 of FIG. 1.

FIG. 3 is a cross-sectional view taken along the line 3—3 of FIG. 2.

FIG. 4 is a cross-sectional view taken along the line 4—4 of FIG. 3.

FIG. 5 is a cross-sectional view taken along the line 5—5 of FIG. 2.

FIG. 6 is an enlarged cross-sectional view showing the manner in which the locating pin of the apparatus engages the record.

FIG. 8 is a cross-sectional view taken along the line 8—8 of FIG. 7.

FIG. 9 is a cross-sectional view taken along the line 9—9 of FIG. 4 and shows the record utilized.

DESCRIPTION OF THE PREFERRED EMBODIMENTS

Figure 10:
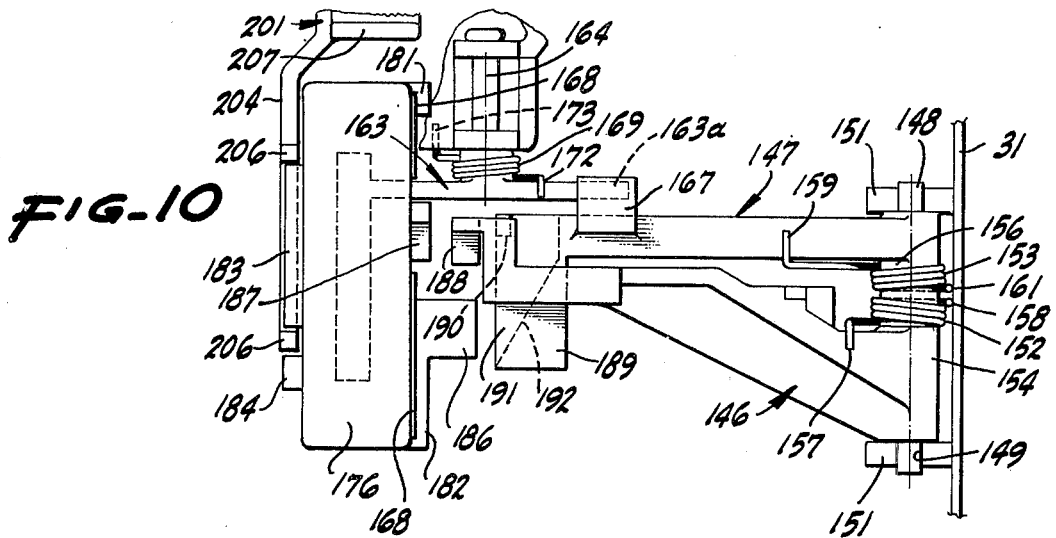
FIG. 10 is an enlarged partial view showing a portion of the switching mechanism.

The miniature apparatus for producing sound from a stationary record which also can be called a microphonograph consists of a base 21 and a cover 22 both formed of a suitable material such as plastic. The base 21 is provided with a planar bottom wall 23 and upstanding end walls 24 and 26 adjoining upstanding side walls 27 and 28. The planar bottom wall 23 is formed with a large circular opening 29.

A large upstanding rib 31 is formed integral with the base 21 and is generally parallel to the end wall 24 and forms a compartment 32 for batteries as hereinafter described.

A window structure 36 is mounted on the base 21 and is secured thereto by suitable means suct as screws 37. The window structure 36 is formed of a suitable transparent material such as plastic. A hollow metal shaft 38 is mounted by press fit in the window structure 36 and depends downwardly therefrom. A cup-shaped rotor 39 is rotatably mounted upon the shaft by suitable means such as bearings 41 and 42 formed of a suitable material such as Delrin mounted in a hub 43 formed as a part of the rotor 39. The rotor 39 is formed of a suitable transparent material such as plastic. The rotor 39 is secured to the shaft 38 by suitable means such as an E-ring 44. The cup-shaped rotor 39 is formed of a disc-like member 46 which lies in a plane which is parallel to the plane of the bottom wall 23 of the base 21 that is shown in FIG. 2 has its lower surface spaced above the lower surface of the bottom wall 23. An upstanding rim 47 is formed integral with the disc-like member 46.

Means is provided for rotating the rotor 39 on the shaft 38 and consists of an O-ring belt 49 which is seated in an annular groove 51 provided on the rim 47 of the rotor 39. The O-ring belt is driven by pulley 52 and is mounted on the output shaft 53 of a small d.c. motor 54. By way of example, it can be a small d.c. permanent magnet motor which operates from a voltage of approximately one volt d.c. The motor 54 is carried by an L-shaped bracket 56 which is secured thereto by screws 57. A pair of grommets 58 formed of a suitable material such as rubber are mounted in open ended slots 59 provided in the bracket 56. The grommets 58 receive tits which extend through the grommets. Screws 62 are threaded into the tits 61 and serve to hold the bracket 56 on the tits. The tits 61 are formed integral with an upstanding member 63 which is integral with the window structure 36. The grommets 58 serve to isolate the motor from the window structure so that vibration from the motor will not be supplied to the window structure. In the same manner, the O-ring belt 49 is formed of a suitable resilient material so that vibration will not be transmitted from the output shaft of the motor to the rotor 39.

A cartridge 66 is provided as a part of the apparatus and includes a needle or stylus 67 which is adapted to engage a record 68 having a plurality of generally circular grooves 69 formed therein carrying sound information. The cartridge 66 is of a conventional type. The needle or stylus 67 for example, can be one having a size ranging from 0.5 mil. to 1 mil. but for the present application preferably has a size of 0.7 mil.

The cartridge 66 is mounted in an arm assembly 71 which may be called a tone arm assembly or a pick-up arm assembly. Means is provided for mounting the arm assembly 71 upon the rotor 39 to permit swinging motion of the outer end of the arm carrying the cartridge 66 about vertical and horizontal pivot axes. This means consists of a pin 72 which is mounted by a press fit in a boss 73 formed integral with the disc-like member 46 of the rotor 39 adjacent the rim 47 (see FIG. 4). The pin 72 extends in a direction which is perpendicular to the planar surface of the disc-like member 46 and serves as a vertical pivot axis as hereinafter described. A pivot member 76 is rotatably mounted upon the pin 72 and is retained thereon by an enlarged end portion 72a on the pin 72. The pivot member 76 includes a pair of aligned pins 77 and 78 which extend in opposite directions radially of the pivot axis formed by the pin 72.

The arm assembly 71 includes an arm 81 which is generally in the form of a hollow body that is generally rectangular in cross-section and has a cartridge 66 carried therein. The arm 81 is formed of a suitable material such as plastic. Two output terminals 82 and 83 of the cartridge 66 are mounted in a pair of slots 84 provided in the arm 81 and serve to hold the cartridge within the arm 81. The arm 81 is formed with a cylindrical boss 86 which is pivotally mounted upon the pin 77 so that the pin 77 forms a horizontal pivot axis for the arm 81 which is parallel to the plane of the disc-like member 46 and perpendicular to the pivot axis formed by the pin 72. The pin 77 is provided with an enlarged end portion 77a to retain the boss 86 thereon. The pin 77 is also provided with a slit 87 so that the outer end portion 77a of the pin 77 can be pressed together to permit the boss 86 to slide over the end portion 77a.

Means is provided for yieldably urging the center end of the arm 81 remote from the pin 77 in the direction towards the disc-like member 46 regardless of the position of the apparatus of microphonograph, and consists of a coil spring 88 which is mounted on the pin 78. The pin 78 also has an enlarged outer end portion 78a which serves to retain the coil spring 88 thereon. The coil spring 88 is provided with one end 89 which underlies an L-shaped member 91 formed integral with the pivot member 76. The L-shaped member 91 is provided with an ear 92 at the outer extremity of the same which extends downwardly from the L-shaped arm and serves to prevent the end 89 from accidentally slipping off the L-shaped member 91. The coil spring 88 is also provided with another end 93 which overlies a member 94 as viewed in FIG. 3 which extends outwardly from the arm 81 and is formed integral with the arm 81. The member 94 is also provided with an ear 96 to prevent the end 93 from accidentally slipping off of the member 94. The arm 81 is provided with a downwardly extending protrusion 97 (see FIG. 4) which engages the upper surface of the disc-like member 46. The protrusion 97 provides an extreme downward limiting position for the arm 81 when the stylus is not in engagement with a record 69.

The disc-like member 46 is provided with an arcuate slot 101 which is formed in coincidence with loci traced by the end of the cartridge 66 as it swings about the vertical axis provided by the pivot pin 72 and extends generally from approximately the center of the disc-like member 46 to the outer margin of the disc-like member 46 as shown in FIG. 3. As can be seen, the slot 101 is of such a width so that the cartridge 76 carrying the stylus 67 can extend therethrough and engage the record 68 (see FIG. 4). An arcuate member 102 which is L-shaped in cross-section is formed integral with the rotor 39 has the upper extremity of the L-shaped portion overlying the slot 101 and serves several functions as hereinafter described. An L-shaped member 103 is secured to the pivot member 76 and has mounted thereon and upstanding pin 104 which is utilized for lifting the arm 81 and the cartridge 66 carried thereby to return it to a home position as hereinafter described.

Means is provided for counterbalancing the arm assembly 71 with respect to the vertical pivot axis formed by the pin 72 and the horizontal pivot axis formed by the pin 77 and consists of a metal counterweight 106 which is secured to the L-shaped member 103 by suitable means such as cement. The counterweight 106 is positioned so that it serves the counterbalancing functions hereinbefore described. Means is provided on the rotor 39 for counter-balancing the mass of the arm assembly 71 and its counter-balancing counterweight 106 and consists of an arcuate metal counterweight 107 which is secured to the periphery of the rotor 39 by suitable means such as by cementing it to the rim 47. As will be noted, it again is positioned in a particular manner so that it serves the counterbalancing function hereinbefore described so that the rotor 39 is statically balanced around its axis of rotation provided by the shaft 38. In this connection, it should be pointed out that the L-shaped arcuate member 102 serves a counterbalancing function in that it has a lip which overlies the opening 101 and in addition serves to provide a mass which compensates for the mass which has been removed by the formation of the opening 101. This member 102 provides some masking of the hole 101. It also serves as a limit for the amount of travel in an upward direction for the arm 81 so that it cannot protrude upwardly and possibly be broken off during rotation of the rotor 39.

The terminals 82 and 83 of the cartridge 66 are connected by wires 111 and 112 to contacts 113 and 114 making contact to conducting rings 116 and 117 carried by an insulating member 118. The insulating member 118 is mounted over the hub 43 of the rotor 39 and rotates therewith. The hub is provided with an upstanding pin 119 which extends through a small hole 121 provided in the member 118. Spring-like wires 122 and 123 are provided which slidably engage the conducting rings 116 and 117. The wipers 122 and 123 are carried by a printed circuit board 126 formed of a suitable insulating material.

A registration pin 127 is slidably mounted in a bore 128 in the hollow shaft 38 and is adapted to extend through the lower extremity of the same as shown in FIG. 6 to engage a V-shaped recess 129 provided in the record 68 in the manner described in copending application Ser. No. 532,329 filed Dec. 13, 1974. The registration pin 128 is spring loaded or in other words, yieldably urged in a direction so it extends out of the hollow shaft 38 by a leaf spring member 131 which is secured by heat staking to the window structure 36 at 132 (see FIG. 1). Registration pin 127 has a head position 127a which is larger in diameter than the bore 128 and serves to limit the travel of the pin 127 under the urging of the lead spring member 131.

Figure 11:
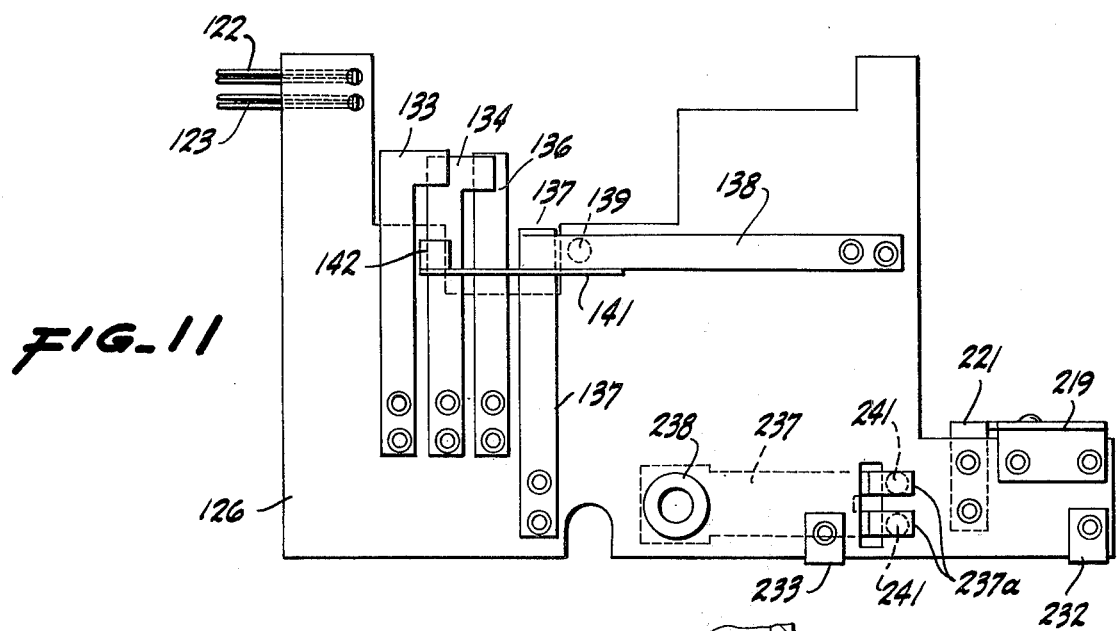
FIG. 11 is another cross-sectional view showing other portions of the switching mechanism.
Figure 7:
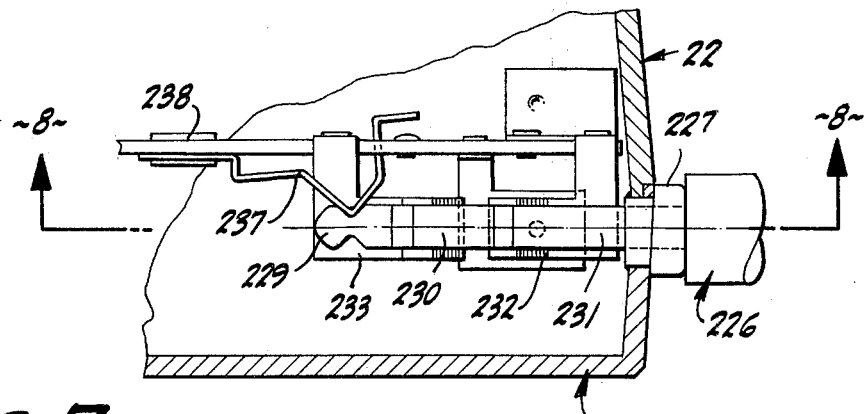
FIG. 7 is a cross-sectional view taken along the line 7—7 of FIG. 1.

The p.c. board 126 carries a plurality of spring-like contact members 133, 134, 136 and 137 (see FIG. 11). The contact members 133 and 134 are L-shaped and have portions thereof overlying each other so that contact member 133 is adapted to engage contact member 134, and contact member 134 is adapted to engage contact member 136. The p.c. board 126 is also provided with an additional contact member 138 which is adapted to engage a contact 139 carried by the p.c. board and which also extends over the contact member 137 and is adapted to engage the same. The contact member 138 is provided with an upstanding extending side member 141 which carries a protrusion or ear 142 which lies in the plane of the p.c. board 126.

Means is provided for operating or moving the hereinbefore described contact members and consists of a rotor latch 146 and a pick-up arm assembly latch 147. The latches 146 and 147 are formed of a suitable material such as plastic and are pivotally mounted upon a metal pin 148 mounted in a suitable manner such as by heat staking in recesses 149 provided in upstanding support members 151 in the base 21 and formed integral with the rib 31. Means is provided for yieldably urging the outer ends of the latches 146 and 147 in a downward direction as viewed in FIG. 10 and consists of two coil springs 152 and 153 in cylindrical bosses 154 and 156 provided on the latches 146 and 147. Spring 152 is provided with an end 157 which overlies the latch 146 and has another end 158 engaging the rib 31. Similarly, the spring 153 is provided with an end 159 which overlies the latch 147 and has another end 161 engaging the rib 31.

A pivot arm 163 is provided which has a shaft 164 formed integral therewith extending at right angles thereto pivotally mounted in a pair of spaced parallel upstanding ears 166 formed integral with the window structure 36. The shaft 164 is provided with an enlarged end portion 164a so that it will be retained within the ears 166. One end of the pivot arm 163 is provided with an upstanding arcuate end portion 163a which is adapted to be engaged by an L-shaped member 167 formed as a part of the arm assembly latch 147. The other end of the pivot arm 163 carries a push button support member 168 which extends at right angles from the pivot arm 163. A coil spring 169 is mounted on a hub 171 of the pivot arm 163 for yieldably urging the push button support member 168 in an upward direction. The spring 169 is provided with one end 172 which overlies the pivot arm 163 and another end 173 which overlies the window structure 36.

Figure 12:
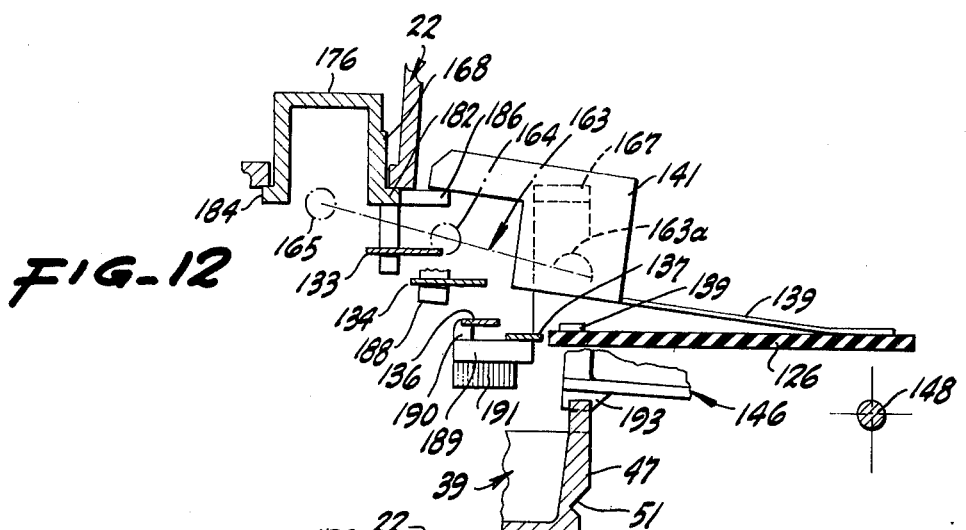
FIGS. 12, 13, 14 and 15 are side elevational views partially in cross-section showing the sequence of operation of the switching mechanism.

A push button 176 is mounted in an opening 177 provided in the cover 22 and overlies the push button support member 168 and is prevented from slidable movement longitudinally thereof by a ridge 174 formed on the member 168 and seated within the push button 176. The push button 176 is provided with a small ledge 178 extending along one side of the same which is utilized for latching the push button as hereinafter described. The push button is also provided with a plurality of outwardly extending lips 181 and 182 provided on one side of the same and additional lips 183 and 184 provided on the other side of the same for engaging the underside of the cover 22 so that the push button will not be ejected therefrom. In addition, the push button 176 is provided with an ear 186 which underlies the ledge 142 provided on the contact member 138 and serves to raise the contact member 138 upwardly to open certain of the contacts as shown in FIG. 12. The push button 176 is also provided with a depending L-shaped member 187 which is adapted to engage the contact member 133 to lift the same as shown in FIG. 12.

Figure 14:
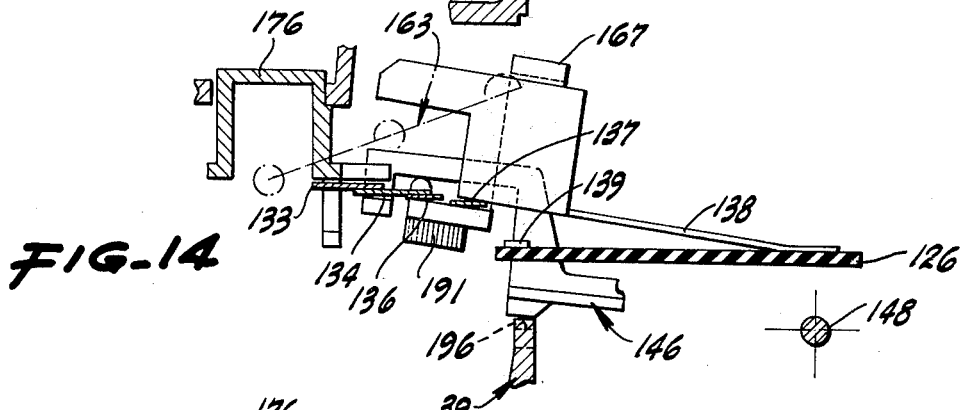

The rotor latch 146 is provided with an L-shaped member 188 which is adapted to engage the contact member 134 shown in FIG. 12. The outer extremity of the arm assembly latch 147 is provided with a member 189 which extends at right angles to the latch 147 which has a sufficient width and is so positioned that it is adapted to engage both of the spring-like contact members 136 and 137 as shown in FIG. 14. The member 189 is provided with an upwardly extending projection 190 on one corner thereof which is adapted to engage the rotor latch 146. The member 189 is also provided with a downwardly extending protrusion 191 which has formed thereon an inclined surface 192 that serves as a cam surface as hereinafter described. The rotor latch 146 is provided with a downwardly extending protrusion 193 which is adapted to be engaged by an upwardly inclined ramp 194 formed integral with the rim 47 of the rotor 39. A detent 196 is provided in the rim 47 and is adapted to receive the protrusion 193 after it has traveled up the ramp 194 to retain the rotor 39 in a locked position for a purpose hereinafter described. As can be seen from FIG. 5, the ramp 194 and the detent 196 are provided in a raised portion of the rim 147. The remainder of the rim has a surface which is substantially below the ramp 194 and the detent 196 and is generally parallel with the disc-like member 46 and is not engaged by the downwardly extending protrusion 193 on the rotor latch 146.

Push button lock means is provided adjacent the push button 176 and consists of a push button lock member 201. The push button lock member 201 is provided with a body 202 which is generally U-shaped in cross-section and has mounted thereon a knurled member 203 which is adapted to be engaged by a finger of the hand and extends upwardly through a hole 208 provided in the cover 22. The member 203 is undercut so that the lock member 201 can be pushed toward the push button 176. An arm 204 is formed integral with the body 202 and extends outwardly therefrom in a direction along the push button 176 and is provided with two upstanding spaced parallel ears 205 which are disposed on opposite sides of the lip 183 provided on the push button 176. The arm 204 rides in a groove 205 provided in the window structure. The body 202 is formed with a ridge 207 which extends at right angles to the arm 204 and is adapted to engage a cooperating or mating downwardly extending ridge (not shown) on the cover 22. The U-shaped body member 202 engages spring members 211 and 212 carried by the window structure 36.

When the push button lock means is not in a push button lock position, the push button 176 can be depressed to operate the microphonograph apparatus as hereinafter described. When it is desired to lock the push button so that it cannot be operated inadvertently, the push button lock member 201 is depressed against the force of the spring members 211 and 212 and is then pushed in a direction towards the push button 176 so that the ears 206 underlie the lips 183 and 184 and also so that the ridge 207 underlies the cover 22. This retains the push button lock member in a position which prevents the push button 176 from being depressed. In order to unlock the push button lock member 201 it is necessary to again press the same against the spring members 211 and 212 and to unlock the ridge 207 to permit the push button lock member to be shifted away from the push button 176 and to thereby move the ears 206 into registration with the space provided between the lips 183 and 184 of the push button 176 to permit the push button to be operated. Thus it can be seen that the push button lock member acts as a slide action detent to prevent operation of the push button 176.

The cover 22 is provided with louvers 216 in the central portion thereof. A two inch conventional loudspeaker 217 is secured to the plastic cover 22 by suitable means such as cement or heat staking. A pair of batteries 218 are mounted in the battery compart 32 and engage first and second contact members 219 and 221 carried by the p.c. board 126. The other ends of the batteries are engaged by a metal clip 222 which serves to retain the batteries in engagement with the contact members 219 and 221 and also serves to form an interconnection between the same.

Means is provided for utilizing an earphone and consists of an earphone jack assembly 226 which is mounted in the base 21. The earphone jack assembly consists of a fitting 227 which is mounted in the end wall 24 and is adapted to receive a jack 228. The jack 228 is provided with a conducting tip 229 and conducting rings 230 and 231. The rings 230 and 231 are engaged by spring-like contact members 232 and 233 carried by the p.c. board 126. The conducting tip 229 is adapted to engage a spring member 237 having one end mounted on the p.c. board by a eyelet 238. The other end of the spring member 237 extends upwardly through a slot 239 provided in the p.c. board and has a portion 237a which is adapted to make contact with contacts 241 mounted upon the p.c. board. The tip 229 is connected by a wire 242 in the earphone jack assembly 226 to a pair of earphones 243. The ring 231 is connected by a wire 244 to the other side of the earphones 243. The ring 230 is connected by a wire 246 to a microphone 247. The ring 231 is connected through the jack assembly 226 by a wire 248 to the other side of the microphone 247.

Figure 16:
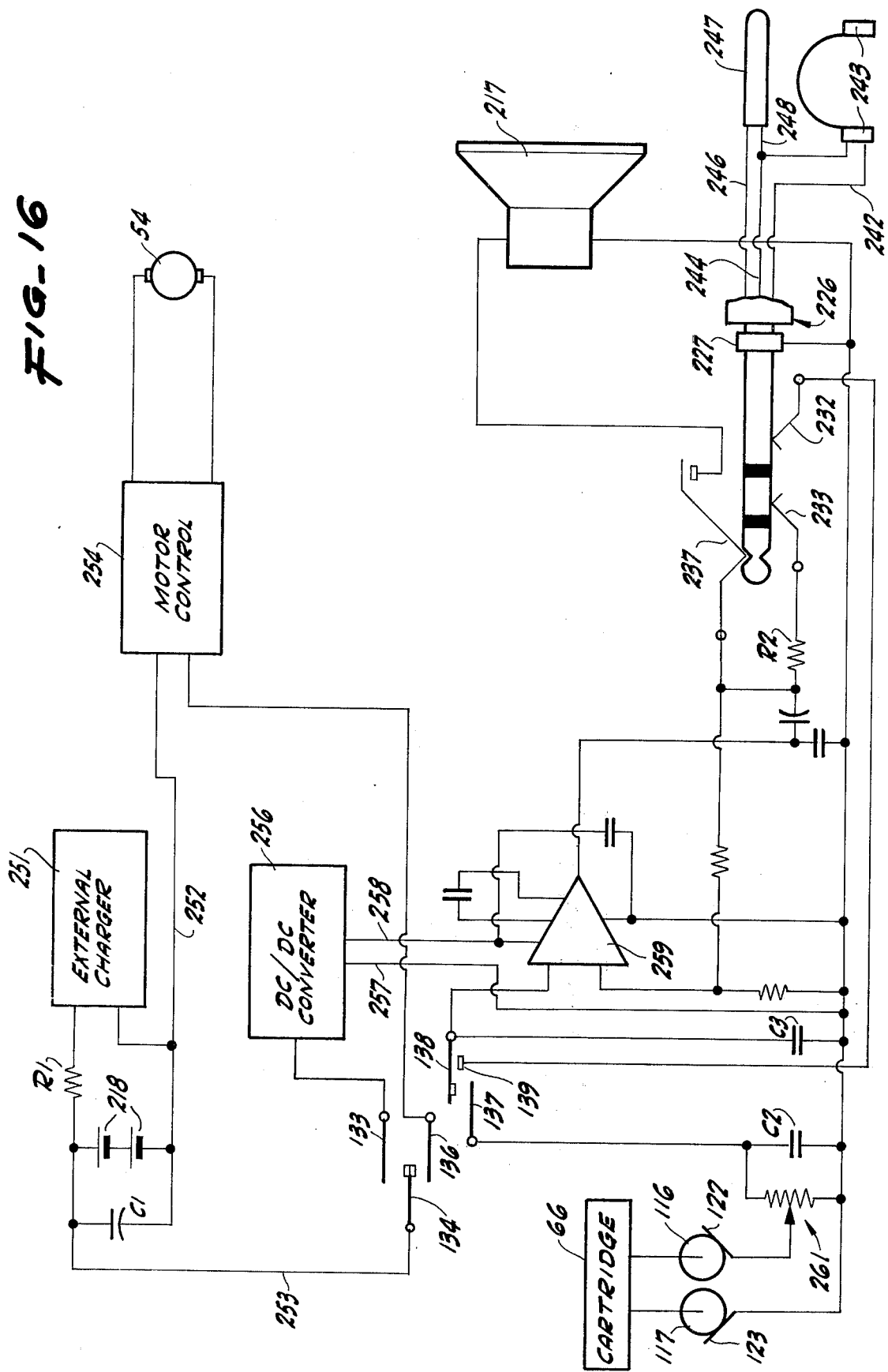
FIG. 16 is a block diagram of the circuitry used in the apparatus.

FIG. 16 is a block diagram of the electronic circuitry mounted upon the p.c. board and also shows certain of the components which are utilized therewith in schematic form. As shown in FIG. 16 an external battery charger 251 can be provided for recharing the two batteries 218 which are connected in series through a resistor $R_1$. By way of example, the batteries 218 can have an output voltage of 1.5 volts to provide a total maximum output voltage of approximately 3 volts. A large capacitor $C_1$ which is provided in parallel with the series connected batteries 218 serves as a filter capacitor so that there is supplied on line 252 a 3 volts filtered d.c. with the line 253 serving as the common or ground line. This line is connected to a series of switches hereinafter described and then to a motor control circuit 254. This motor control circuit 254 includes an adjustable potentiometer to permit adjusting the level of the voltage to be supplied to the motor 54. Basically the motor control circuit is of a conventional type and serves to provide a current at a voltage of approximately 1 volt to the motor depending upon the setting of the potentiometer so that the voltage supplied by the batteries 218 which can vary from approximately 1.8 to 3 volts to provide a constant output ranging from approximately 0.85 volts to 1.2 volts. This makes it possible to supply a substantially constant voltage to the motor 54 regardless of the voltage which is being supplied by the batteries 218 and thus makes the voltage supplied to the motor 54 virtually independent of the condition of the batteries 218. It should be appreciated that if desired, one could utilize a speed regulator in place of a voltage regulator for the motor control 254.

A d.c. to d.c. converter 256 is also connected to the voltage supply provided by the batteries 218 and has an output on line 257 which is approximately equal to −9 volts with respect to the common line 258. This is supplied to a conventional integrated circuit audio amplifier 259. The amplifier 259 receives an audio signal from the crystal pick-up 66 through the slip rings 116 and 117, through the pick-up brushes 122 and 123 and through an adjustable potentiometer 261 which has a filter capacitor $C_2$ across the same. The output from the potentiometer is supplied through a switching arrangement hereinafter described to the integrated circuit amplifier 259. The volume control 261 is provided with a dial or knob 262 (see FIG. 1) which extends through a hole 263 in the cover 22 and thus is accessible to the operator. A potentiometer (not shown) provided in the motor control circuit 254 is not adjustable by the operator but is accessible by the use of a screwdriver or the like. Another capacitor $C_3$ is provided at the input to the integrated circuit amplifier 259 to prevent oscillations. The integrated circuit amplifier 259 is provided with additional external components which have values well known to those skilled in the art. The output of the amplifier 259 is normally supplied to the speaker 217. Provisions has been made as hereinbefore described to incorporate an earphone jack so that the output from the amplifier 259 is supplied to the earphones rather than to the speaker and when the jack is inserted, opens the circuit to the speaker. A resistor $R_2$ serves to reduce the signal level supplied to the earphones to an appropriate value.

When it is desirable to reduce the cost of the microphonograph, the external charger 251 can be eliminated. In addition, in place of the integrated circuit amplifier 259, discrete components can be utilized to provide a simpler amplifier. By utilizing discrete components, the d.c. to d.c. converter can be eliminated. Also the switching structure can also be simplified. In addition, the audio active circuit hereinafter described can also be eliminated as well as the earphones and the provisions for the earphone jack and the provisions for a microphone.

Operation and use of the microphonograph or the apparatus for reproducing sound from a stationary record can now be briefly described as follows. Let it be assumed that the motor 54 is operating at a suitable speed and that the speed reduction between the output shaft 53 of the motor and the rotor is such that the rotor rotates at a speed of 133 ⅓ r.p.m. Also let it be assumed that it is desired to utilize the microphonograph or apparatus for reproducing sound from the stationary record 68 which can be mounted on a page of a book or the like. The microphonograph is then taken by the hand and the operator by peering through the window structure 36 positions the microphonograph generally over the record 68 and into a general position in which the registration pin 127 is disposed slightly above the center of the record. The microphonograph is then pulled gently over the record until one can feel the registration pin 127 engaging the V-shaped groove 129 provided in the record until it engages the bottom of the V-shaped groove as shown in FIG. 9. The microphonograph is now in a position to commence the reproduction of sound information carried by the record 68.

Let it be assumed that the switching mechanism within the microphonograph is in the position shown in FIG. 12, or in other words in the "off" position. As can be seen from FIG. 12 in this position, the push button 176 is in an "up" position with its lips 181, 182, 183 and 184 in engagement with the cover 22. The rotor 39 is in its "at-home" position with the protrusion 193 carried by the rotor latch 146 in engagement with the detent 196 provided in the rim 47 of the rotor 39. As also can be seen from FIG. 12, all of the switch contacts are in the open position.

Figure 13:
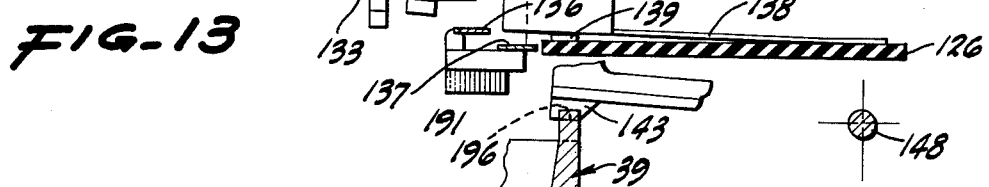

Now let it be assumed that the push button 176 is partially depressed as shown in FIG. 13. As this is occurring, the L-shaped member 187 is also lowered to permit the contact member 133 to come into engagement with the contact member 134. It also permits the contact member 138 to be lowered so that it comes into engagement with the contact 139. Completion of these contacts activates what is called the audio active circuit. Closing of the contacts 133 and 134 causes battery power to be supplied to the d.c. to d.c. converter 256 which supplies the voltage to the integrated circuit amplifier 259 to energize the same.

When the jack 228 is inserted into the fitting 227, contact is made to the contact member 232 so that a connection is made to a contact 139 carried by the p.c. board. As shown in FIG. 16, when the push button 176 is depressed, a circuit is established from the contact member 232 to the contact 139 and through the contact member 138 to the input of the integrated circuit amplifier 259. With the circuitry in this condition, one can speak into the microphone 247 and hear his own voice amplified through the integrated circuit amplifier 259 and have it reproduced by the earphones 243 connected through contact 237, plug tip 229 and common or ground through ring 231 and contact 232.

Now let it be assumed that it is desired to now listen to the record over which the microphonograph has been placed. In this case, the push button 176 is depressed still further to depress the push button support member 168 which is pivoted about the shaft 164 to cause the end portion 163a to engage the L-shaped member 167 to raise the arm assembly latch 147 which in turn causes the member 189 to be raised and which since it underlies the rotor latch 146 causes the rotor latch to be raised to raise the protrusion 193 out of the detent 196 shown in FIG. 14 to permit the rotor 39 to rotate. Raising of the arm assembly latch causes the member 136 to be raised into engagement with the contact member 134. At the same time the contact member 137 is moved upwardly by the member 189 so that it engages the member 138 and lifts it off of the contact 139 to open the microphone circuit. When it is desired to hold the push button 176 in this position, it is rocked on the push button support member 168 so that the ledge 168 is moved into engagement with the cover 22 and serves to retain the push button in this position. Moving of the contact 136 into engagement with the contact member 134 closes the battery circuit to the motor control circuit 254 to energize the motor 54 to thereby cause rotation of the rotor 39. Movement of the contact member 137 into engagement with the contact member 138 closes the circuit from the cartridge 66 to the integrated circuit amplifier 259 which is connected through the contact member 237, the tip 229 of the jack 228 fo the earphones 243.

At the time that the arm assembly latch 147 is raised, the cam surface 192 is raised to release the pin 104 permitting the arm asssembly 71 to be released so that the arm 81 carrying the cartridge 66 is moved downwardly as viewed in FIG. 4 by the force of the coil spring 88 to bring the stylus 67 into engagement with the inner lead-in track of the record 68. The rotor 39 which is beginning its rotation continues its rotation to cause the stylus 67 to travel along the generally circular grooves 69 of the record 68 from the inside out. Normally this is continued until all of the information carried by the record has been reproduced and has been heard either through the speaker 217 or through earphones 243 by the use of a jack inserted into the fitting 227.

Figure 15:
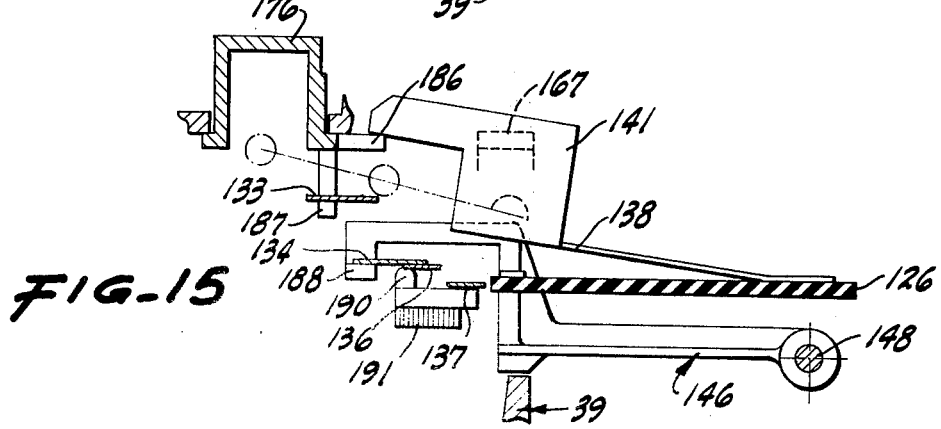

At the end of the information carried by the record or at any time previous thereto if desired, the push button 176 can be released so that it is returned to its uppermost position as shown in FIG. 15 by the action of the spring 169 upon the push button support member 168. The push button 176 is released by pushing it so that the ledge 168 no longer engages the cover 22. As the push button 176 is moved upwardly, it carries with it the contact member 133 which is engaged by the L-shaped member 187 carried by the push button 176. At the same time, the contact member 138 is raised by the ear 186. Lifting of the contact member 133 so that it is no longer in engagement with the contact member 134 opens the circuit to the d.c./d.c. converter circuit 256 so that power is no longer supplied to the amplifier 259. Lifting the contact member 138 so that it is no longer in engagement with the contact member 137 opens the circuit from the cartridge 66.

At the same time that the push button 176 is being moved upwardly by the push button support member 168, the pivot arm 163 is being pivoted on the shaft 164 to permit the arm assembly latch 147 to move downwardly under the force of spring 153 and to also permit the cam surface 192 carried thereby to drop to its lowermost position. At the same time, the rotor latch 146 is also permitted to move to its lowermost position under the force of the spring 152 in the same manner that the coil spring 153 caused the arm assembly latch 147 to be moved to its lowermost position.

In the contact positions shown in FIG. 15, the contact members 134 and 136 are still in engagement with each other which keeps the motor 54 energized. The motor will remain energized until the rotor 39 reaches a position in which the cam surface 194 moves into engagement with the protrusion 193 carried by the rotor latch 146 and causes it to be raised as shown in FIG. 5 to lift the contact member 134 off of the contact member 136 to de-energize the motor circuit. The rotor 39, however, will continue to rotate under the kinetic energy stored therein until the protrusion has ridden completely up the ramp 194 and is dropped into the detent 196 to lock the rotor 39 and to stop further rotation of the rotor 39.

During the time that the motor 54 is being de-energized and the rotor 39 is being latched, the pin 104 comes into contact with the cam surface 192 which causes the arm 81 and the cartridge 66 carried thereby to be lifted upwardly out of the arcuate recess 101 and also to be cammed inwardly into the starting position shown in FIG. 3. Thus at the time the rotor 39 reaches the latched position, the arm assembly 71 will have returned to its at-home or rest position after which another cycle can be started merely by depressing the push button 176 in the manner hereinbefore described.

In connection with the foregoing, it should be appreciated that the microphonograph can be operated in any position, that is right side up, upside down, sideways etc. This is true because spring means has been provided for yieldably urging the cartridge into engagement with the record and thus it will operate independently of the direction of the force of gravity upon the cartridge. In addition, this is made possible because the arm assembly itself is counterbalanced and the rotor on which it is mounted is also counterbalanced for the arm assembly mounted thereon and its counter weight. These features in addition to making it possible to utilize the microphonograph in any position also increase the resistance of the microphonograph to external shock.

The microphonograph also has a number of additional advantages. The controls have been mounted in such a manner that they make operation of the microphonograph very convenient. For example, the volume control and the push button switch can be conveniently actuated without disturbing the relationship of the microphonograph and the record. By operating the push button, the power is automatically switched on so there is no tendency for the power to be left on inadvertently. This is particularly important where the power supply is from batteries. In addition, there is provided a push button lock to prevent that start push button from being inadvertently actuated. This push button lock is also conveniently located. The visible area for looking at any printing associated with the record has been increased. The window surfaces in the microphonograph are parallel to the printed page so as to avoid extraneous light reflection.

The push button control has two modes of operation either push and hold or push and lock depending upon the desire of the operator. As hereinbefore described, when it is desired to push and hold, it is merely necessary to cause the small ledge carried by the push button to engage the cover.

By the utilization of the motor control circuit it is possible to provide a microphonograph in which a motor operates essentially at a constant speed regardless of any decrease in the voltage being supplied by the batteries. The switching mechanism utilized in conjunction with the printed circuit board makes it possible to provide a relatively great number of switching functions in a relatively simple manner.

The microphonograph is constructed in such a manner so that it can be readily assembled with a minimum of hand wiring.

By providing the audio active circuit hereinbefore described, it is possible for a user who is wearing a headset to hear his own voice through the amplifier 259 via the microphone 247 by pushing the push button 176 half-way down into the position shown in FIG. 13. By pushing the push button 176 further down, the microphone 137 can be cut out and the cartridge 66 cut in to hear information contained on the record. This particular feature is particularly advantageous in learning a language in which one can hear the language on the record and lifting the push button 176 can stop the rotor 39 and thereafter he can again activate the audio-active circuit to talk into the microphone and hear himself speak to ascertain whether or not he is utilizing the correct pronunciation.

It is apparent from the foregoing, that there has been provided a new and improved microphonograph or in other words an apparatus for reproducing sound from stationary records which has many advantages. Its construction is such that it can be utilized as an educational device. In a simplified version, it also can be utilized as a toy.

What is claimed is:

1. In an apparatus for reproducing sound from a stationary record, a base, a main shaft mounted on the base, a disc-like member mounted on said main shaft, means carried by said base for rotating said disc-like member, a cartridge having a stylus therein adapted to engage the record, an arm assembly carrying said cartridge in one end thereof, means mounting said arm assembly on said disc-like member to permit swinging motion of said one end of said arm assembly about horizontal and vertical pivot axes, said disc-like member having an arcuate slot therein through which the stylus can extend to engage the record, coounterbalance means carried by the arm assembly so that the arm assembly is counterbalanced about its pivot axes, counterbalance means carried by the disc-like member counterbalancing the disc-like member for the mass of the arm assembly and its counterbalance means, means yieldably urging said arm assembly and the cartridge with its stylus in a direction to move the stylus into a position whereby it may engage the record in any the stylus into a position whereby it may engage the record in any position of and the arm for moving said arm and the cartridge carried thereby with its stylus out of engagement with the record and for returning it to and retaining it in an at-home position latch means carried by the base for latching said disc-like member to prevent rotation of the same when said arm assembly is in said at-home position and push button means carried by said base and movable to a position to release said disc-like member to permit rotation of the same and to cause operation of said means carried by said base for rotating said disc-like member and for releasing said arm assembly to permit the cartridge and the stylus carried thereby to move to a position whereby the stylus can engage the record.

2. Apparatus as in claim 1 together with means for amplifying sound signals and switch means operated by said push button means for connecting said cartridge to the amplifying means.

3. Apparatus as in claim 2 together with means for receiving a microphone, and means for disconnecting said cartridge from said sound amplification circuit and connecting said microphone into said sound amplification circuit.

4. Apparatus as in claim 1 wherein said cooperative means for moving said arm assembly and the cartridge carried thereby includes an arm latch pivotally mounted on said base, said arm latch carrying a cam surface and a pin carried by said arm assembly and adapted to engage said cam surface.

5. Apparatus as in claim 4 wherein said arm latch includes a member secured to said arm latch and a pivot arm cooperatively associated with said push button and said member of said arm latch whereby when said push button is depressed, said arm latch is raised.

6. Apparatus as in claim 5 together with spring means for yieldably urging said pivot arm in a direction to move said push button into a raised position.

7. Apparatus as in claim 1 wherein said means for latching said disc-like member includes a rotor latch pivotally mounted on said base, means carried by said rotor latch for engaging said disc-like member to lock the same and means carried by the arm latch for operating said rotor latch.

8. Apparatus as in claim 7 together with spring means engaging the arm latch and the rotor latch for urging the same in one direction independent of each other.

9. Apparatus as in claim 8 wherein said disc-like member is in the form of a rotor having an upstanding rim, said rim having inclined ramp formed thereon with a detent following the ramp and wherein said rotor latch includes a protrusion adapted to engage the ramp and to be seated in the detent.

10. Apparatus as in claim 9 together with switching means engaged by the push button and the arm latch and the rotor latch for initially causing energization of the amplifier as the push button is partially depressed and thereafter causing rotation of the disc-like member as the push button is fully depressed.

11. Apparatus as in claim 10 together with means carried by the push button for latching the push button in a fully depressed position.

12. Apparatus as in claim 10 wherein when the push button is released, the switching means causes the amplifier to be first de-energized and thereafter de-energizes the means for causing rotation of the disc-like member.

13. Apparatus as in claim 12 wherein said ramp on said rotor causes said motor to be de-energized when said protrusion has traveled up the ramp and in which the rotor is latched in position when the protrusion drops into the detent.

14. Apparatus as in claim 1 wherein said main shaft is hollow together with a registration pin slidably mounted in said shaft and spring means for yieldably urging the registration pin in one direction with respect to the shaft.

15. Apparatus as in claim 14 wherein said main shaft is stationary and wherein said disc-like member is rotatably mounted on the main shaft.

16. Apparatus as in claim 1 wherein said disc-like member is substantially transparent and wherein a transparent window structure is mounted on said base and wherein said means for causing rotation of said disc-like member includes a motor resiliently mounted on said window structure, a pulley driven by said motor and resilient belt means connecting said pulley to said disc-like member to cause rotation of said disc-like member.

17. In apparatus for reproducing sound from a stationary record, a base having a planar lower surface, a main shaft mounted in said base perpendicular to said surface, a rotor carried by said shaft and having a disc-like member carried by said shaft and disposed in a plane parallel to the surface of the base, said rotor also having an upstanding rim generally perpendicular to the surface of said base, said rotor being substantially transparent, a window structure carried by said base and generally overlying said rotor, a motor resiliently mounted on said window structure, a pulley driven by said motor, resilient belt means interconnecting said pulley and said rotor for rotating said rotor as said motor is operated, a cartridge having a stylus and adapted to engage the record, an arm assembly carrying said cartridge in one end thereof, means mounting said arm assembly on said rotor to permit swinging movement of said one end of said arm assembly about horizontal and vertical pivot axes, said disc-like member of said rotor having an arcuate slot therein through which the stylus of the cartridge can extend to engage the record over which the base is disposed, spring means carried by the arm assembly for yieldably urging the arm assembly in a direction so that the stylus is yieldably urged through said arcuate slot into engagement with said record, an arm latch pivotally mounted on said base, said arm latch and said arm asssembly being provided with cooperative means including a cam surface and a pin for moving said arm assembly and the cartridge carried thereby into and out of the arcuate slot, rotor latch means pivotally mounted on the base, said rotor latch means having means for causing de-energization of said motor and for latching said rotor in a locked position and means carried by the base for causing movement of the arm latch and the rotor latch to release the arm assembly to permit the cartridge with the stylus to extend through the arcuate slot to engage the record and to release the rotor to permit the rotor to be rotated.

18. Apparatus as in claim 17 together with audio amplification circuitry and switch means engaged by the means for operating the rotor latch and the arm latch to cause energization of the motor when the rotor has been released and for connecting the cartridge to the audio amplification circuitry.

19. Apparatus as in claim 17 together with a registration pin slidably mounted in said shaft and spring means for yieldably urging said registration pin in one direction with respect to the shaft.

* * * * *